United States Patent

[11] 3,620,255

[72] Inventor Ben Stillman
 Cupertino, Calif.
[21] Appl. No. 59,985
[22] Filed July 31, 1970
[45] Patented Nov. 16, 1971
[73] Assignee Adcotech Corporation
 Mountain View, Calif.

[54] ROTARY GATE VALVE
 9 Claims, 6 Drawing Figs.
[52] U.S. Cl. .................................................. 137/625.45,
 251/164, 251/195
[51] Int. Cl. ..................................................... F16k 3/10
[50] Field of Search ....................................... 137/625.44,
 625.45, 610; 251/158, 164, 168, 187, 195

[56] References Cited
 UNITED STATES PATENTS
 1,219,392 3/1917 Hagen ........................... 251/158
 1,487,921 3/1924 Deisch ........................... 137/625.45
 3,237,916 3/1966 Bryant ........................... 251/158

Primary Examiner—Harold W. Weakley
Attorney—Limbach, Limbach & Sutton

ABSTRACT: A thin quick action rotary gate valve that require a short insertion length in the fluid line being controlled. In the closed position, a valve gate is held against the valve seat by a combination of fluid pressure and mechanical forces. To open the valve, the gate is moved directly away from the seat to avoid rubbing or wedging, and is then rotated out of the fluid path so as not to obstruct flow. In closing, the reverse action takes place to provide a nonrubbing closure.

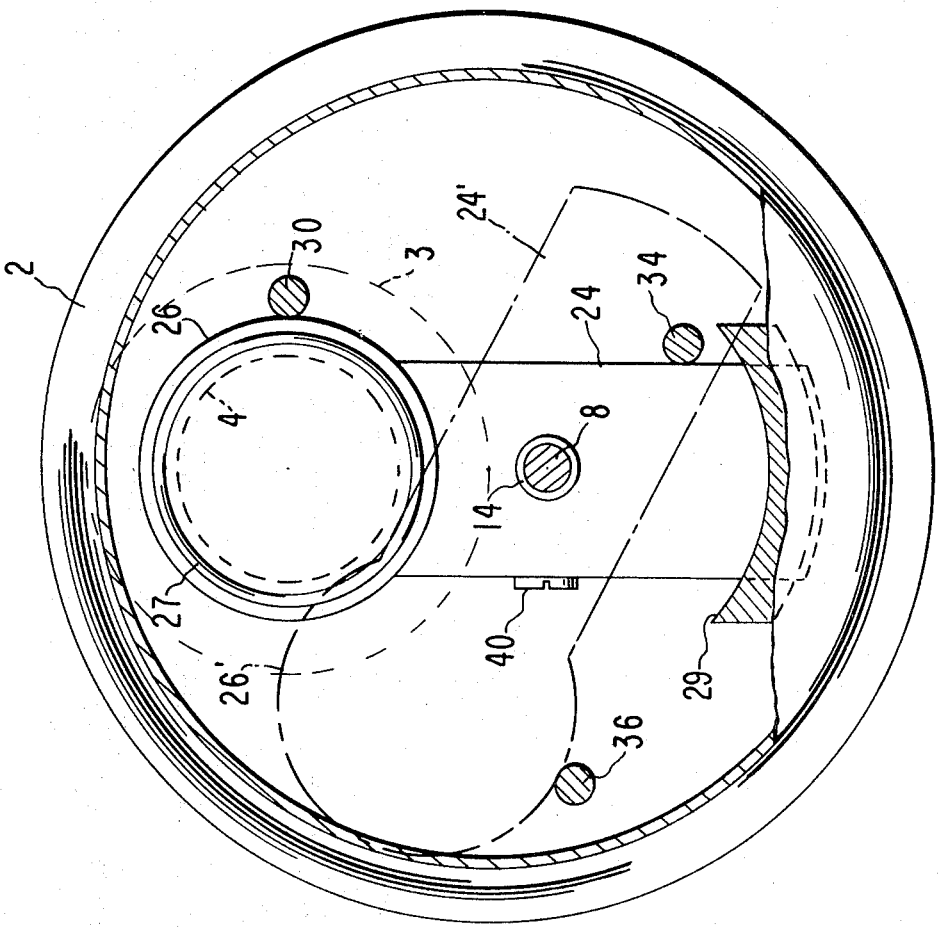

INVENTOR.
BEN STILLMAN
BY
*Limbach, Limbach and Sutter*
ATTORNEYS

ROTARY GATE VALVE

BACKGROUND OF THE INVENTION

The invention relates to valves and more particularly to a valve having a rotary valve gate. The valve is usable with either gaseous or liquid fluid flows and may be adapted for insertion in lines which insertion in lines of widely varying diameters with manual, electrical or pneumatic dives.

Prior art gate valve designs may be described as devices in which the rotary or linear motion of a gate rubs or wedges the sealing surface directly across the seat which causes wear; or where an elaborate camming device forces the sealing surface against the seat.

Three early rotary-type gate valve patents are of interest: O. W. Spratt, U.S. Pat. No. 241,568; E. Lunkenheimer, U.S. Pat. No. 301,823; and H. F. Smith, U.S. Pat. No. 863,004. In the Spratt patent a valve plate is raised from its closed position and moved out of the inlet-outlet path by a shaft cam, ball, pivot and arm arrangement in a plane parallel to cam shaft axis. It is apparent that Spratt's cam does not provide any substantial sealing force on the valve gate when it is closed. Spratt is not attempting to control a high-pressure fluid flow and for his purposes relies on a mercury pool surrounding his output to provide adequate sealing.

Smith provides a single inlet dual outlet valve wherein the valve gate is rotated to cover either output by an external handle. The gate is not lifted away from its seat before it is rotated, thus the gate rubs against the seat of each outlet, causing wear, and the sealing force is limited by spring action.

In Lunkenheimer, a rotary valve gate is controlled by an offset shaft turned by a handle. To open and close the value, the disc sealing surface must necessarily rub against the valve seat at an approach angle equivalent to the pitch angle of the gland thread.

The present invention overcomes the difficulties of prior art by providing a simple highly efficient rotary gate valve that can be rapidly and effectively changed from open to closed position and vice versa. Moreover, the valve is subject to little wear due to the elimination of rubbing between the valve gate sealing surface and the valve seat.

A valve gate carrying a sealing device such as an integrally mounted O-ring is rotated in either direction for opening or closing the valve. This rotation is accomplished by transmission of the driving torque through a friction device between the threaded drive shaft and the valve gate threaded hole. Approximately one-fourth turn of the drive shaft is used to accomplish the necessary rotation of the valve gate. Another one-fourth turn of the drive shaft is used to convert the rotary motion of the drive shaft to linear motion of the valve gate thus providing a perpendicular raising or lowering of the valve gate on or off the valve set. This linear motion is accomplished by slippage of the above-mentioned friction device while the valve plate is contained from any rotational motion by stop pins. Thus, one-half turn in one direction is a complete opening or closing cycle. To close the valve, the shaft is rotated until it hits a stop placing it in position over, but not touching the valve seat. Further rotation pulls the valve directly toward the seat until a tight highly efficient seal is achieved. To open the valve the screw is rotated in the opposite direction; initially a stop pin holds the gate from rotating as the gate moves away from the seat. Once it clears the top of the stop pin, the frictional relation between the screw and gate causes the gate to rotate out of the inlet-outlet flow path to the open position where a third stop pin prevents further rotation.

The thin valve feature of the present invention can control the flow in lines having substantial diameters while requiring only a small axial insertion length in the line.

BRIEF DESCRIPTION OF THE DRAWINGS

FIG. 1 is a side elevational cross section of an embodiment of the rotary gate valve according to the present invention.

FIG. 2 is a partially cut away plan view of the valve of FIG. 1 showing the rotary gate in the opened and closed positions.

FIG 3 is a further embodiment of the invention depicting a partially cutaway of the valve gate member showing a means for controlled friction force.

DESCRIPTION OF THE PREFERRED EMBODIMENTS

Figure 4:
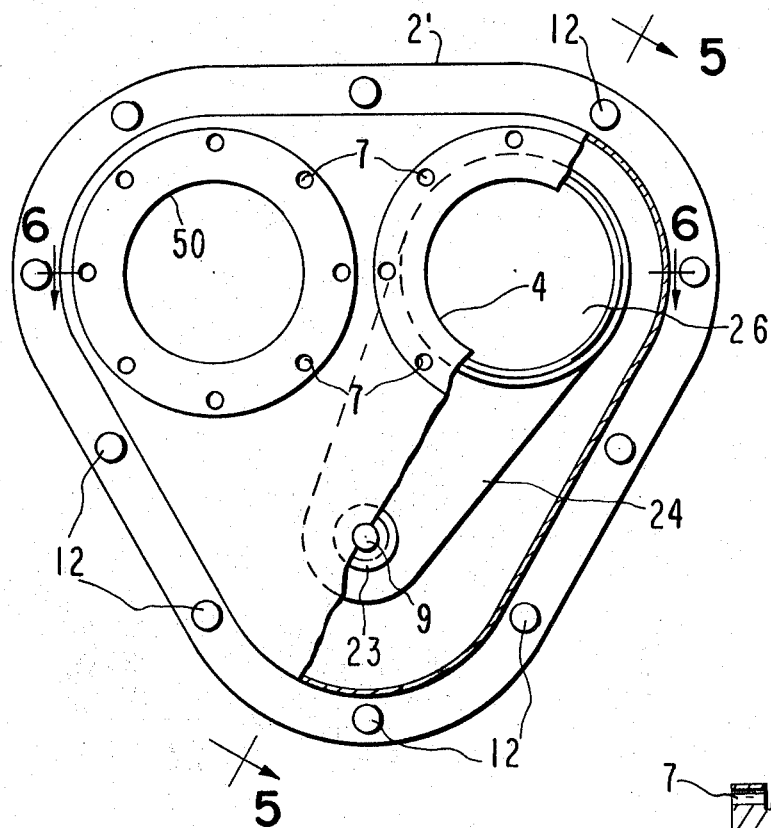
FIG. 4 is a partially cutaway plan view of a rotary control valve modification of the valve of FIGS. 1-3.

Referring now to FIGS 1 and 2 of the drawings, a first embodiment of the rotary gate valve is shown. A relatively thin, valve casing 2 has an inlet 4 and outlet 6 that are axially aligned. Flanged portions 3 and 5 on the inlet 4 and outlet 6, respectively, are provided for connecting the valve to pipes (not shown) carrying a fluid to be controlled. Alternatively, any conventional means of attaching external pipes may be used. Holes 7 are provided in the flanges for bolts to secure the valve to the external piping system. Casing 2 may be formed from two pieces that can be bolted together with an O-ring seal or welded at the flanged edge portions, for example. A shaft and screw 8 passes through the casing 2 wall on the outlet 6 side. Shaft 8 has a screw-threaded portion 14 in the interior of casing 2 and is held against lateral movement by a support ring 16 in interior wall of casing 2 on the inlet 4 side. Shaft 8 has a circular notch 18 in its periphery outside the casing that is engaged by a flanged portion 20 of a ring 22 that is fixedly attached to the casing wall. Shaft 8 is thus held against any significant axial movement but is free to rotate.

A rotatable elongated member 24 has a central aperture 25 threaded for yieldable frictional engagement with the screw-threaded portion 14 of shaft 8. A valve gate 26 of generally circular shape in the plane perpendicular to the axis of outlet 6 may be integral with member 24 as shown herein or may be a separate element fixed to member 24. An O-ring 27 is provided in gate 27 opposite outlet 6 for sealing purposes as described hereinafter.

Since shaft 8 is in yieldable frictional engagement with member 24, the member 24 and gate 26 will swing inside the valve casing 2 as shaft 8 is rotated. And if member 24 is held against rotary movement, then the lateral position (as viewed in FIG. 1) of member 24 and gate 26 may be varied.

A first stop pin 30 is fixed to the casing 2 wall on the outlet 6 side to engage the right-hand edge of gate 26 as shaft 8 is rotated clockwise (as viewed in FIG. 2). Pin 30 is located to provide registry of gate 26 over the valve seat 32 that is the portion of outlet 6 opening into valve casing 2. As shaft 8 is continued to be rotated clockwise the member 24 and gate 26 will be drawn into seat 32 until the gate and seat are in fluid-sealing engagement with the cooperation of O-ring 27. Pin 30 is of sufficient height to prevent rotation of gate 26 past the point of alignment for any lateral position of member 24 along the screw thread portion 14 of shaft 8. A U-shaped member 29 spaces the bottom end of member 24 from the inside wall of casing 2 so that member 24 will not be skewed when the valve is tightly closed. As shaft 8 is rotated counterclockwise a second stop pin 34 of lesser height than pin 30 prevents swing or rotation of member 24 and gate 26 until gate 26 has been spaced a distance from seat 32 equal to the height of pin 34. Then upon continued rotation gate 26 will swing away from seat 32 to the open position 26' determined by a third stop pin 36 that engages the left-hand edge of gate 26. Pin 36 is located to permit gate 26 to be moved completely out of the path between inlet 4 and outlet 6 in order that fluid flow not be interrupted.

Depending on the lead angle of the screw threads the mechanical advantage for sealing and the angle of rotation of shaft 8 required to achieve opening and closing may be varied. By way of example, a ½–13 n.c. pitch thread has been found to require a 180° turn of shaft 8 from opening to closure.

It will be apparent that there are two forces contributing to a tight seal when the valve is closed: the fluid flow line pressure will tend to force the valve gate against the valve seat and the force caused by the tightening of the screw 14 by shaft 8 will provide a tight seal. By way of further example, a valve of the type described here has been tested at 110 p.s.i. and found leak free in submerged bubble test.

Referring now to FIG. 3, a further embodiment of the valve is shown wherein the frictional force between the valve gate member 24 and the threaded portion 14 of shaft 8 may be adjusted. A partially threaded hole 38 is provided in the side of valve gate member 24 to the threaded portion 14 of shaft 8. A friction force screw 40 fits into the threaded portion of hole 38 and adjusts the force provided by a helical or coiled spring 42 against a friction member 44. Member 44 may be a plug of Teflon, for example. Member 44 rubs against threaded portion 14 of shaft 8 and provides additional friction for operating the valve. The spring tension set by screw 40 is ordinarily preset during manufacture since it is not accessible from outside the valve casing 2.

Figure 5:
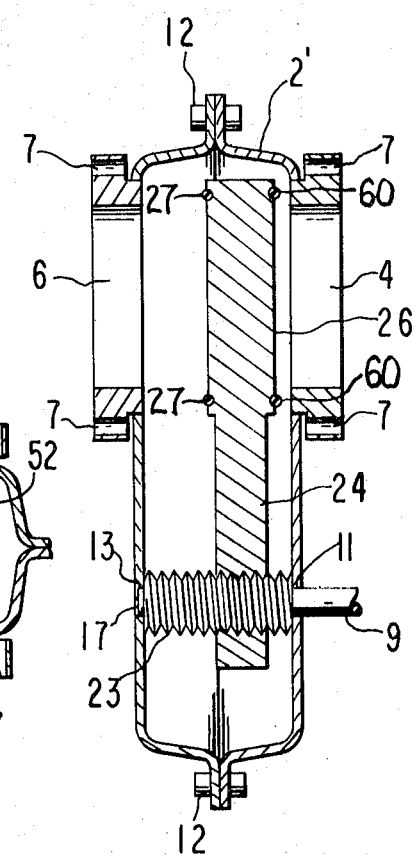
FIG. 5 is a side elevational cross section of the valve of FIG. 4 along lines 5—5.
Figure 6:
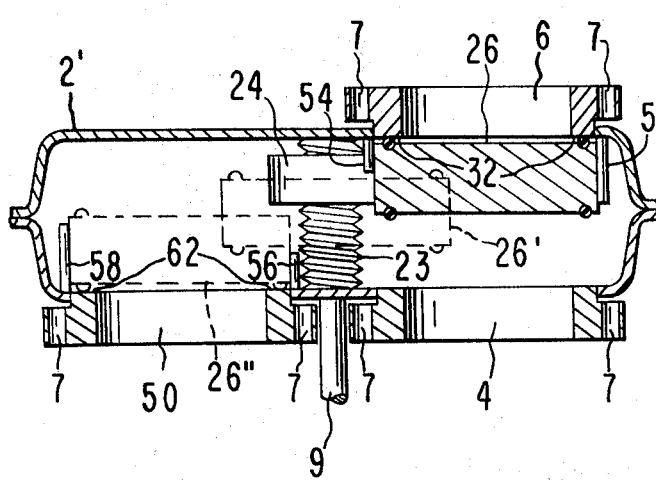
FIG. 6 is a cross section of the valve of FIG. 4 along section lines 6—6.

Referring now to FIGS. 4, 5, and 6, a rotary control valve embodiment of the valve of FIGS. 1 and 2 is shown. Whenever possible the same reference numerals are carried through the various figures and are used in connection with this alternate embodiment.

A triangularlike (as viewed in FIG. 4) valve casing of relatively thin dimension as viewed in FIGS. 5 and 6, has a single inlet 4 and a pair of outlets 6 and 50. As will be described in greater detail below, the valve gate may be positioned to close either outlet 6 or outlet 50. As in the embodiment of FIGS. 1 and 2, inlet 4 has a flanged portion 3 and holes 7 for bolts to attach an inlet pipe (not shown) and outlet 6 has a flanged portion 5 with holes 7 for bolts to attach an outlet pipe (not shown). Likewise, the second outlet 50 has a flanged outer portion 64 having peripheral holes 7 for attaching a second outlet pipe (not shown). Alternatively, any conventional means of attaching external pipes may be used. A modified swinging member 24 having a valve gate portion 26 is placed in yieldable frictional engagement with a screw portion 23 of a shaft 9. Member 24 is tapered in shape and has no long portion extending below the shaft as does member 24 in FIGS. 1 and 2. Depending on the limitations of casing dimensions, it is desirable to have member 24 external below shaft 9 (or 8 in FIGS. 1 2) as far as feasible to provide as large as moment arm as possible. The screw portion is of greater diameter than control shaft 9 and end portion 13 so that the end 13 may be fit into a recess 17 before the two halves of casing 2' are joined allowing shaft 9 to pass through a hole 11 in the second half of casing 2' so that the shaft 9 is held rotatably between the opposing casing walls. If desired, shaft 8 of FIGS. 1 and 2 may also be held in this manner. Likewise, the frictional holding described in FIG. 3 may be used with the embodiment of FIGS. 4—6. Casing 2' may be welded together or bolts 12 may be used to securely hold the two halves together. Although not shown, sealing rings and other conventional means may be used to prevent fluid leaks as around the shaft 8 and 9.

Referring now specifically to FIG. 6, the valve gate 26 is shown engaging the valve seat 32 over outlet 6. O-ring 27 aids in a fluidtight seal. A stop pin 52 engages one edge of gate 26 to align the gate over the valve seat when the shaft 9 is rotated counterclockwise. When shaft 9 is further rotated, gate 26 is brought into engagement with seal 32 to close outlet 6 in the same manner as in the embodiment of FIGS. 1 and 2. When shaft 9 is rotated clockwise, gate 26 is removed from engagement with seat 32 thereby opening outlet 6. When the gate 26 clears a short stop pin 54, assuring that the gate will not rub against the seat, gate 26 begins to move across the valve casing interior as shown in phantom position 26'. Upon further rotation, when gate 26 strikes pin 58 at phantom position 26'', the gate is aligned over the second outlet 50 having a valve seat 62. A second O-ring 60 is provided to aid in closing outlet 50. In the same manner as described above for seat 32, valve gate 26 engages seat 62 when the shaft 9 has been rotated further thus closing the second outlet 50. To open outlet 50, the shaft 9 is rotated counterclockwise. A stop pin 56 causes gate 26 to move outward from seat 62 until the pin is cleared to prevent rubbing between the gate and seat.

While the invention has been described with respect to the particular embodiments in the specification, modifications and variations within the scope of the invention may occur to those of ordinary skill in this art. The scope of the invention is therefore to be defined by the appended claims.

I claim:

1. A rotary gate valve comprising:
   a valve casing an inlet and an outlet,
   a drive shaft mounted in said casing and offset from said outlet, said shaft having a threaded portion within said casing and a shaft drive portion extending outside said casing, said screw rotatably contained from substantial axial motion,
   a valve gate having an elongated end portion with a central threaded aperture therein rotatably mounted in yieldable frictional engagement with said shaft threaded portion,
   a seat over said outlet adapted for registry in fluid sealing engagement with said gate, first stop means for preventing rotation of said member past the point of registry between said gate and said seat when said shaft is rotated in a first direction to provide fluid sealing engagement as said shaft is rotated further in said first direction,
   second stop means for preventing rotation of said member until said gate has moved a predetermined distance from said seat when said shaft is rotated in the opposite direction, and third stop means for stopping rotation of said member when said shaft is continued to be rotated in said opposite direction.

2. A rotary gate valve according to claim 1 wherein said valve casing is a thin body and said inlet and outlet are in substantial axial alignment.

3. A rotary gate valve according to claim 2 wherein said gate has a generally circular portion having an O-ring mounted therein for facilitating sealing engagement with said valve seat.

4. A rotary gate valve according to claim 1 further comprising means for providing a predetermined controlled frictional engagement between said member and said shaft threaded portion.

5. A rotary gate valve according to claim 1 further comprising:
   a second outlet having a seat thereon adapted to engage said gate, said outlet located to provide registry with said gate when said gate is rotated in said opposite direction against said third stop means to provide fluid sealing engagement when said shaft is rotated further in said opposite direction, and
   fourth stop means, for preventing rotation of said member until said gate has moved a predetermined distance from said second outlet seat when said shaft is rotated in said first direction, whereby the rotary gate valve provides control valve action.

6. A rotary gate valve according to claim 5 wherein said valve casing is a thin body and said inlet and first recited outlet are in substantial axial alignment and said second outlet is offset from the axis of said inlet and first recited outlet.

7. A rotary gate valve according to claim 6 wherein said casing includes a pair of opposing substantially planar wall portions, said inlet and second outlet disposed in one of said wall portions and said first recited outlet disposed in said other wall portion.

8. A rotary gate valve according to claim 7 further comprising:
   a second O-ring, said first recited O-ring mounted on one side of said gate to facilitate sealing engagement with said first recited outlet, and said second O-ring mounted on the other side of said gate to facilitate sealing engagement with said second outlet.

9. A rotary gate valve according to claim 8 further comprising means for providing a predetermined controlled frictional engagement between said member and said shaft threaded portion.

* * * * *